INVENTOR.
ALFRED W. STEWART.

Dec. 17, 1968 A. W. STEWART 3,417,233

CARD READER

Filed Sept. 21, 1964 3 Sheets-Sheet 2

INVENTOR.
ALFRED W. STEWART

INVENTOR
ALFRED W. STEWART.

United States Patent Office 3,417,233
Patented Dec. 17, 1968

3,417,233

CARD READER

Alfred W. Stewart, New Paltz, N.Y., assignor to Datron Systems, Inc., Mountain Lakes, N.J., a corporation of New Jersey Filed Sept. 21, 1964, Ser. No. 397,929
7 Claims. (Cl. 235—61.11)

ABSTRACT OF THE DISCLOSURE

A card reader for reading punched tabulated cards comprising a continuous drive for inlet and outlet drive rolls on opposite ends of the card reader with card reading means interposed between the inlet and outlet drive rolls for continuously sensing information on the card.

This invention relates to a card reader and more specifically to a unitary device for sensing the presence or absence of indicia in predetermined positions in an indicia bearing member.

In order to describe and claim the invention herein an embodiment thereof has been selected consisting of a rectangular card in which information is stored through the presence or absence of holes in predetermined positions. It should be understood, however, that the invention can be readily adapted to utilize other types of indicia bearing members in which the information has been placed by means other than holes, such as magnetic or electrically conducting material, for example.

Although complicated and sophisticated card reading devices are available today there has been a recognized need for a highly versatile card reading device of the type described herein.

It is a principal object of this invention to provide a compact, unitary, portable and rugged card reading device which is relatively inexpensive and easy to operate and which may be used by itself or as an integral part of a more sophisticated system.

It is another object of this invention to provide such a card reading device which is highly versatile and which may be adapted to read cards of a variety of configurations, and sizes, with a variety of punched hole configurations at a variety of speeds.

It is still another object of this invention to provide an indicia determining device which can provide an electrical output signal by sensing the presence or absence of indicia in a variety of forms embodied in a variety of types of indicia bearing mediums.

It is a further object of the invention to provide a card reader which presents a useable electrical output signal.

A card reader constructed in accordance with the teachings of this invention and the manner of using it will be described herein with references to the drawings in which.

Figure 1:
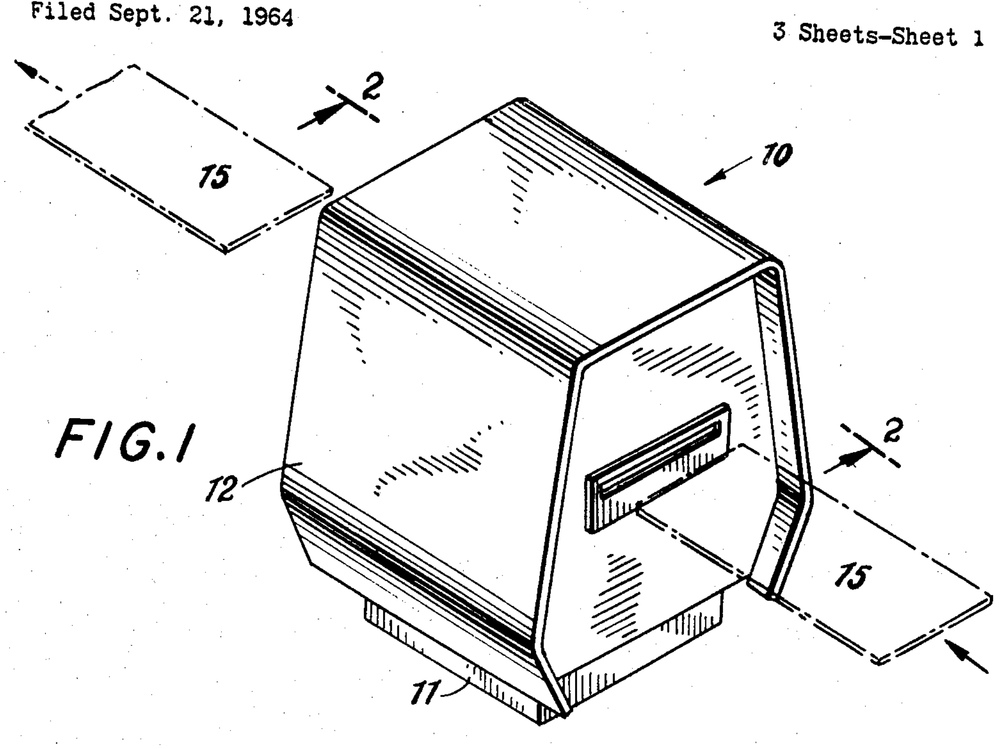
FIG. 1 is a top perspective view of a card reader constructed in accordance with the teaching of this invention with cards being read shown in phantom.

In the figures the numeral 10 indicates a card reader constructed in accordance with this invention consisting of base 11, cover 12 and vertical front and rear walls 13 and 14 respectively, receiving, reading and ejecting tabulating or punched cards 15 containing punched holes for coding purposes. The cards 15 are well known in the art and in the embodiment of the invention disclosed herein the device is constructed to read cards with transverse rows, each of which contain twelve positions of punched information. The device of course can be modified to read punched cards with other coding configurations.

Essentially the operation of the device is such that the cards are driven longitudinally, one at a time, through the device under a stationary reading head consisting of a set of reading brushes disposed transversely side by side and numbering the same as the columns or positions in a row providing a serial output in the form of relay contact closures.

Hence front face 13 is provided with an opening or throat 15' formed by inlet members 16 and 17 projecting therethrough. Throat 15' is slightly greater in vertical dimension than the thickness of one card 15 and slightly wider than one card 15 so that only one card can pass therethrough at a time. The dimensioning of the throat must take into consideration maximum card dimensions due to manufacturing tolerance and humidity conditions. Members 16 and 17 are formed at throat 15 with inwardly inclined lips 16' and 17', respectively, to facilitate passage of a card therethrough. A similar opening 18 is formed in rear wall 14 providing an exit slot for the cards.

A longitudinal support member 19 of substantially U cross-section is mounted on the base and provides the body supporting certain internal components of the device.

Figure 2:
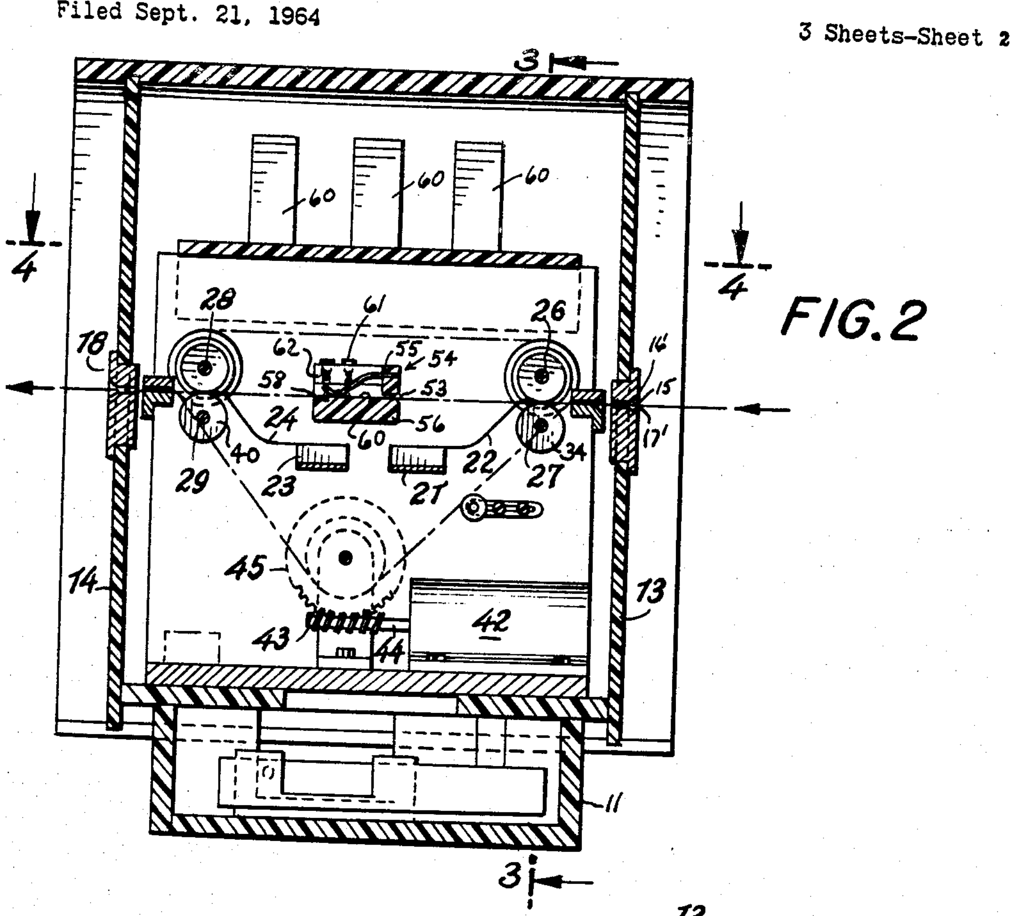
FIG. 2 is a longitudinal sectional view taken along the line 2—2 in the direction of the arrows as shown in FIG. 1.
Figure 4:
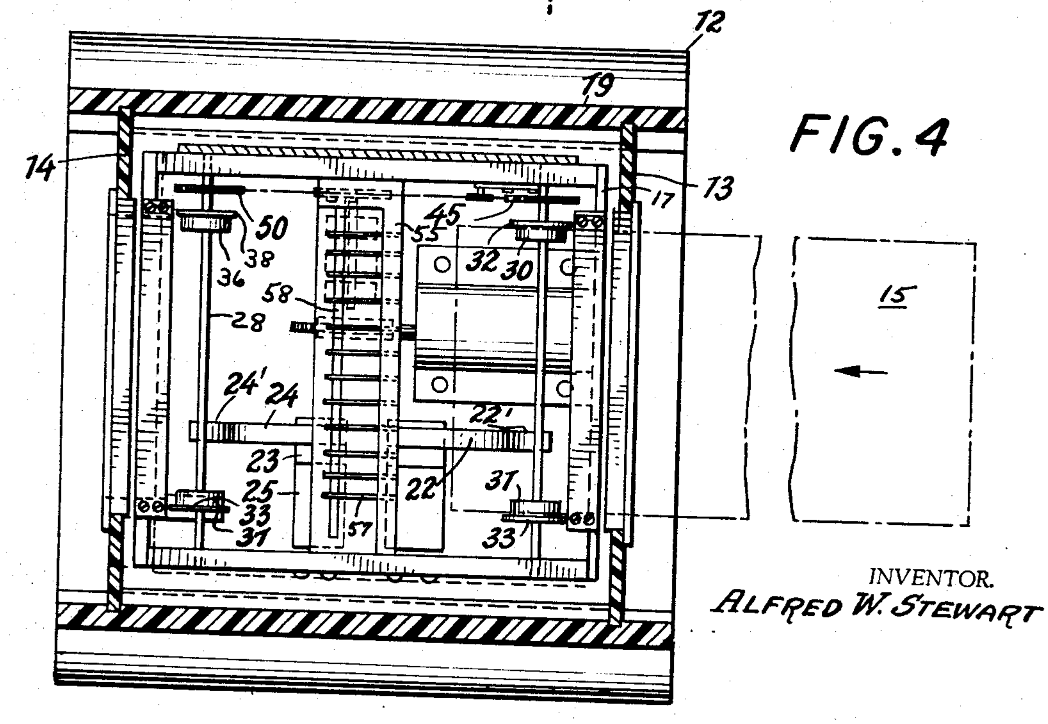
FIG. 4 is a transverse sectional view from above taken along the line 4—4 in the direction of the arrows as shown in FIG. 2.

A bracket 20 supports microswitch 21 with arm 22, provided so that a slight downward movement or displacement of arm 22 will result in actuation of the switch. End 22' of arm 22 is formed as an arc opening downwardly and positioned immediately behind throat 15 so that a card entering through throat 15 will strike the arm and press it downwardly, actuating switch 21 continually while the card passes thereover from right to left as seen in FIGS. 2 and 4. After the card has passed over end 22' the arm will return to its upward or nondepressed position.

A like switch 23 with its associated arm 24 and arcuate end 24' is supported by bracket 25 immediately inside of exit slot 18 so that a card about to pass out of the device will maintain arm 24 depressed and switch 23 actuated until the card has passed thereover.

Transverse shafts 26 and 27 are supported one above the other on the same vertical center line respectively above and below end 22' of arm 22 and transverse shafts 28 and 29 are supported on the same vertical center line, respectively, above and below end 24' of arm 24. Shafts 26 and 28 will be referred to herein as front and rear drive shafts, respectively, and shafts 27 and 29 will be referred to, respectively, as front and rear follower or idler shafts.

Front drive wheels 30 and 31 with respective flanges 32 and 33 are rigidly fastened to drive shaft 26, and front follower wheels 34 and 35 are rotatably supported on follower shaft 27 but restrained from movement along the length of the shaft. The drive wheels are formed with a circumference made up of a layer of a resilient elastomer of such mechanical properties as represented by a polyurethane or neoprene of a hardness of "40 Shore A durometer," with associated flange having a slightly greater diameter.

Drive wheels 30 and 31 are positioned on shaft 26 so that the inside surfaces of flanges 32 and 33 are in line with the ends of throat 15. A card passing through throat 15 will thus be further guided and positioned by the flanges on the drive wheels. Front follower wheels 34 and 35 are located directly below drive wheels 30 and 31, respectively, with the vertical distance between shafts 26 and 27 such that the periphery of the drive wheels and follower wheels just meet or have a common tangent.

Thus with front drive shaft 26 rotating, as will be described below, when a card is advanced to the vertical center line of the front drive wheels and follower wheels, it is gripped and advanced by these wheels to the left in FIGS. 2 and 4. The rubber peripheral portion of the drive wheels, being resilient, is deflated by the thickness of the card during this operation.

End 22′ of arm 22 is positioned so a card advanced through throat 15 will engage end 22′ and actuate switch 21 just before it engages the front drive and follower wheels.

Rear shafts 28 and 29 support like drive and follower wheels in like manner. Hence rear drive wheels 36 and 37 corresponding to front drive wheels 30 and 31 are identical therewith and having flanges 38 and 39, are fixedly supported on shaft 28 and rear follower wheels 40 and 41 corresponding to front follower wheels 34 and 35 are rotatably supported on shaft 29. The vertical distance between shafts 28 and 29 is likewise sufficient to allow a common horizontal tangent at the juncture of drive and follower wheels and are aligned with the front drive and follower wheels, throat 15 and slot 18.

End 24′ of arm 24 is positioned so that the trailing edge of a card passing from right to left in FIGS. 2 and 4, and through slot 18 will not allow switch 23 to open until the card has passed the vertical center line of the rear drive and follower wheels.

The front and rear drive shafts are driven by synchronous motor 42 supported above base 11 within the casing, through worm wheel 43 attached to motor shaft 44, worm gear 45 engaging wheel 43, shaft 46 to which the worm gear 45 is fixed, sprocket 47 fixed to shaft 46, and roller chain 48 engaging sprockets 49 and 50 on shafts 26 and 28, respectively, and sprocket 47.

Figure 3:
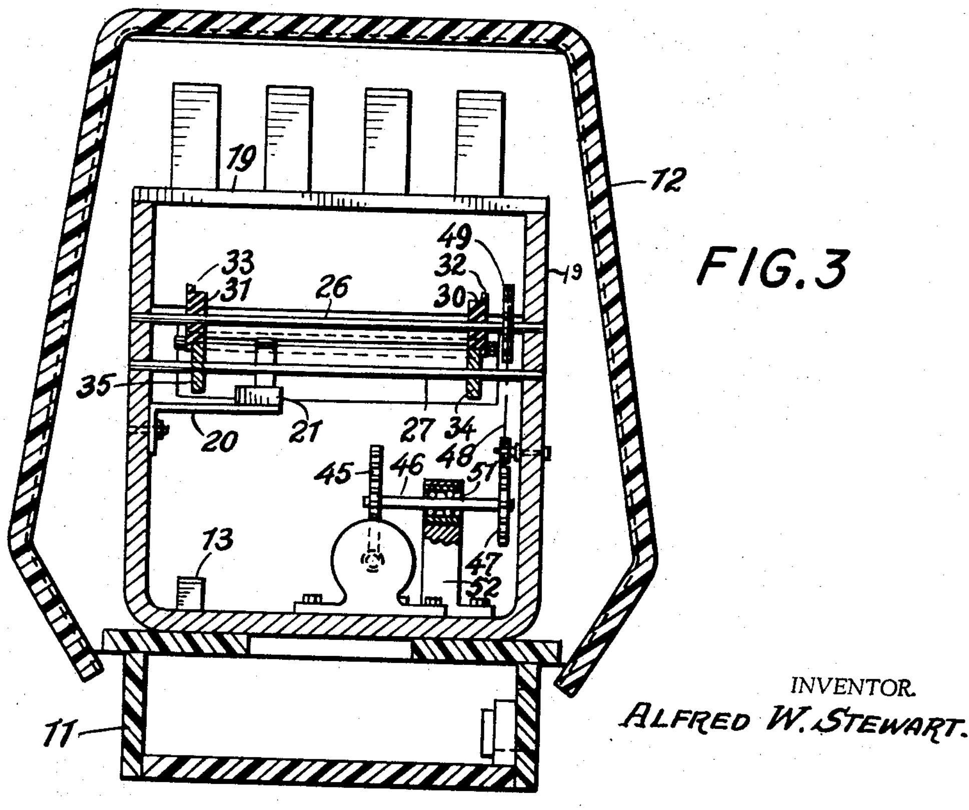
FIG. 3 is a partially sectional view taken along the line 3—3 in the direction of the arrows as shown in FIG. 3.

The motor in this embodiment is designed to receive 115 volts 60 cycle power through a provided line cord and turn its shaft at 1800 r.p.m. in a clockwise direction as viewed in FIG. 3. Speed reduction is otbained through the worm gear arrangement causing the worm gear to rotate at 225 r.p.m.

Shaft 46 is rotatably supported in bearing 51 in bracket 52 and sprocket 53 is an adjustable idler provided to take up slack in chain 48.

It is seen therefore that provision is made for allowing one card to enter the device at a time through throat 15, and to advance the card to emit it through exit slot 18.

A read station 54 is provided in the path of card travel midway between throat 15 and slot 18. The reading station contains two transversely mounted insulating strips 55 and 56 with upper strip 55 mounting a plurality of individual brushes 57 transversely side by side. The brushes are in line with and equal in number to the available information positions in a single transverse row in the card to be read. That is one brush is available at one position when a transverse row is within read station 54. Lower strip 56 mounts a transverse conducting strip 58 beneath brushes 57 which are formed of resilient material and continually urged into contact with strip 58.

The read station is provided with an entering throat 53 having the same dimensions and in line with throat 15 and a guide slot 60 having the same width and in line with throat 59.

Two sense switches 61 and 62 are provided to sense the presence or absence of a card in the read station. These switches are in normally opened condition and are electrically in series so that both switches must be closed to energize conducting strip 58. Switch 61 is positioned so that the leading edge of a card passing through the read station will cause it to close just before the leading edge reaches the center line of the read brushes 57. Switch 62 is positioned so that it is closed when the leading edge of the card is just on the far side of the center line of read brushes.

Figure 6:
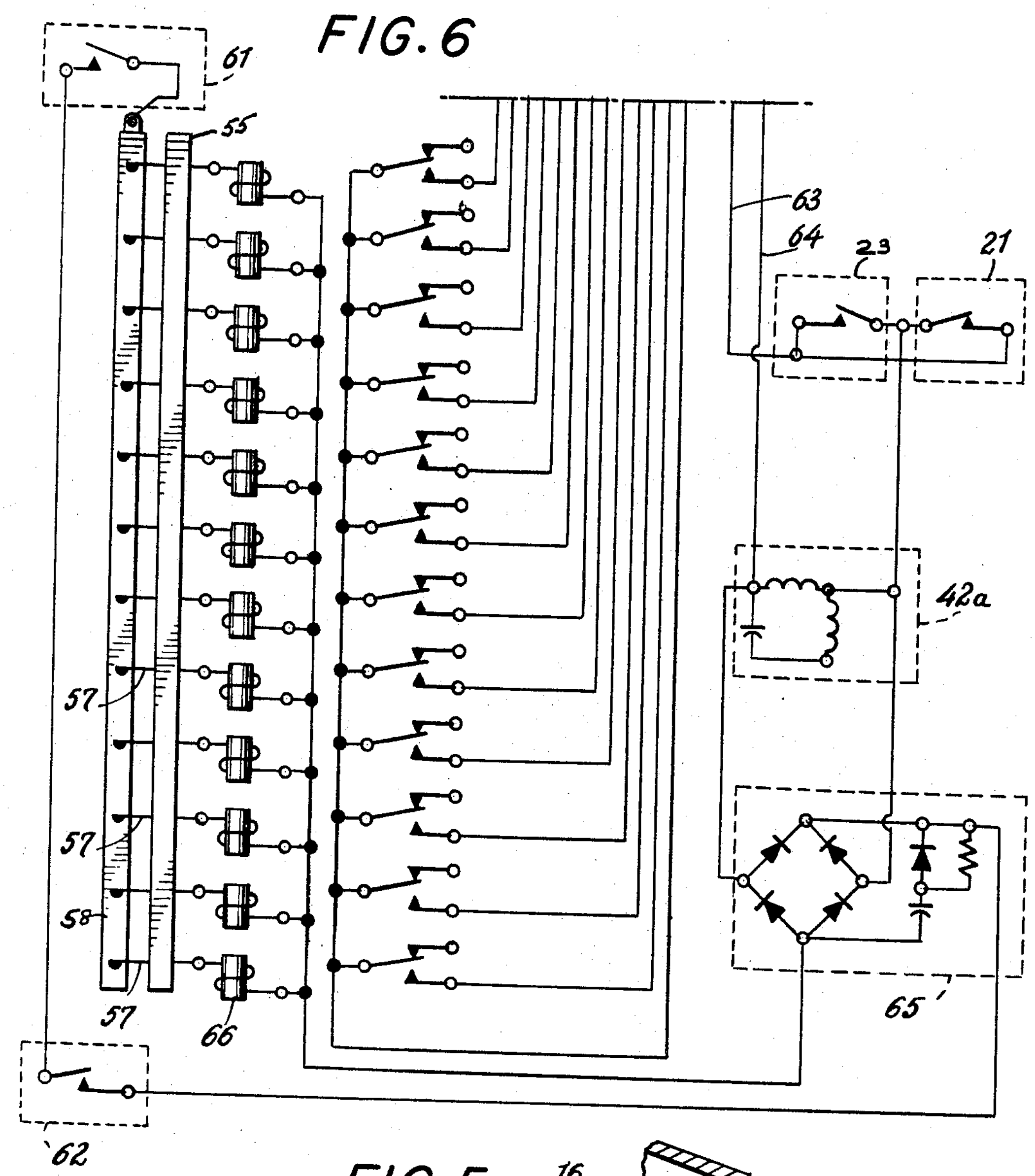
FIG. 6 is a schematic diagram of the electrical circuity of the reader.
Figure 5:
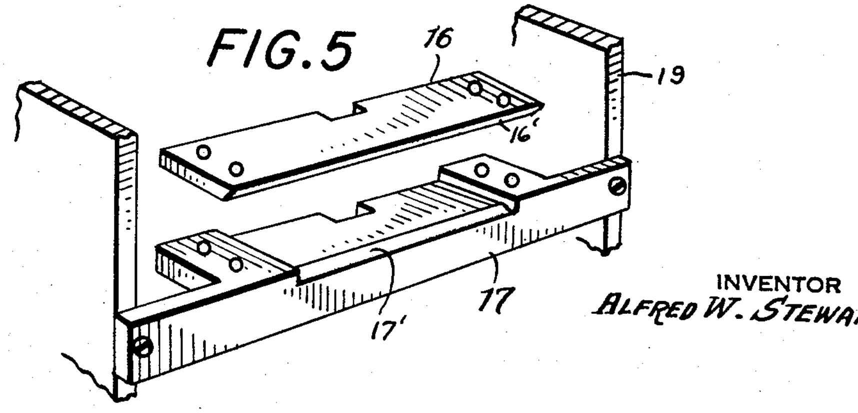
FIG. 5 is an exploded perspective view of the members which form the throat for entrance of cards into the reader shown in FIG. 1.

The operation of the reader described above will now be explained with reference to FIG. 6 which is an electrical schematic of the device.

A card to be read is fed lengthwise into throat 15 which will only allow the passage of one card at a time, until its leading edge engages end 22′ of normally open switch 21 closing its contacts and allowing voltage from leads 63 and 64 to enter the winding **42*a* of motor 42. The motor becomes operative rotating front drive wheels 30 and 31 advancing the card to the read station 54 at the speed of the periphery of the drive wheels. As the card enters the read station switch 61 is closed and as the first information row moves into position beneath brushes 57, switch 62 is closed placing conducting strip 58 in circuit with leads 63 and 64 through rectifier 65. The circuit is open, however, and can only be completed through one or more brushes 57 and associated relay coil 66**.

As the card passes between brushes 57 and strip 58 the brushes are insulated from strip 58; however, wherever a punched hole is present in the card the corresponding brush 57 will make contact with strip 58. Each brush being electrically wired to one side of the coil 66 of its corresponding relay, and the other side of each coil being electrically connected to strip 58 through rectifier 65 and switches 61 and 62, power is applied to the corresponding relay coil and the relay is energized providing a useful output signal representative of the information contained in the card by the presence of a hole in a specified position. The relay so energized may activate further circuits or may activate a read-out device.

The card is continually moved to the left in FIGS. 2 and 4 by the front drive wheels continually passing new rows of information positions beneath the reading brushes until the leading edge of the card is engaged by the rear drive and follower wheels which undertake to continue the movement of the card until it is ejected through slot 18. The front and rear drive shafts are spaced apart so that the distance between them is at least equal to or less than the length of a card.

As the trailing edge of the card approaches the read position switches 61 and 62 remain closed. When the last information position row in the card is moved from the center line of the brushes the trailing edge of the card moves from switch 61 allowing it to open and remove the common strip 58 from the circuit.

Thus, among others, the several objects of this invention, as specifically aforenoted, have been achieved. Obviously numerous changes and modifications can be made without departing from the spirit of the invention.

I claim:

1. In a device for sensing the presence or absence of indicia in an indicia bearing member the combination including inlet and outlet throats through which an indicia bearing member can enter and exit said device, respectively, a read station between said throats in the path of travel of said indicia bearing member from said inlet throat to said outlet throat continuous drive means continuously transporting an indicia bearing member from said inlet throat and through said read station to said outlet throat, actuating means for said drive means, said actuating means having sensing means for determining the presence of an indicia bearing member within said device between said inlet and outlet throats whereby said drive means is actuated, said drive means including a first drive member rotatably supported between said inlet throat and said read position, a first follower member in the vertical plane of said first drive member, a second drive member rotatably supported between said outlet throat and said read position, a second follower member in the vertical plane of said second drive member, said drive members and said follower members positioned for passage of said indicia bearing member between a respective drive member and follower member and in frictional engagement with said drive member, and motor means for rotating said drive members.

2. A device in accordance with claim 1 in which each of said drive members is circular and has a peripheral surface formed of a resilient elastomer.

3. A device in accordance with claim 2 in which said elastomer has a hardness of "40 Shore A" durometer.

4. A device in accordance with claim 2 in which each of said follower members is circular and respective drive and follower members have a common tangent.

5. A device in accordance with claim 4 in which said inlet and outlet throats are horizontal slots and each of said drive members is provided with flanges having inside facing surfaces spaced a distance substantially equal to the width of said indicia bearing member.

6. A device in accordance with claim 5 in which said inlet and outlet throats have vertical distances slightly greater than the thickness of an indicia bearing member.

7. A device in accordance with claim 6 in which inclined lips are provided at said inlet and outlet throats to facilitate passage of an indicia bearing member therethrough.

References Cited

UNITED STATES PATENTS 3,080,113 3/1963 Croll ............. 235—61.11

DARYL W. COOK, *Primary Examiner.*